(12) United States Patent
Silverlock et al.

(10) Patent No.: US 12,507,060 B2
(45) Date of Patent: Dec. 23, 2025

(54) IDENTITY-BASED POLICY ENFORCEMENT FOR SIM DEVICES

(71) Applicant: CLOUDFLARE, INC., San Francisco, CA (US)

(72) Inventors: Matthew Silverlock, Brooklyn, NY (US); Christian Ehrig, Munich (DE); Oliver Zi-gang Yu, Austin, TX (US); Nicholas Alexander Wondra, Savoy, IL (US); Catarina Pires Mota, Lisbon (PT)

(73) Assignee: CLOUDFLARE, INC., San Francisco, CA (US)

( * ) Notice: Subject to any disclaimer, the term of this patent is extended or adjusted under 35 U.S.C. 154(b) by 339 days.

(21) Appl. No.: 18/474,819

(22) Filed: Sep. 26, 2023

(65) Prior Publication Data

US 2024/0107294 A1    Mar. 28, 2024

Related U.S. Application Data

(60) Provisional application No. 63/377,189, filed on Sep. 26, 2022.

(51) Int. Cl.
| | | |
|---|---|---|
| *H04W 8/26* | (2009.01) | |
| *H04W 8/18* | (2009.01) | |
| *H04W 12/08* | (2021.01) | |
| *H04W 12/72* | (2021.01) | |

(52) U.S. Cl.
CPC ............. *H04W 8/26* (2013.01); *H04W 8/183* (2013.01); *H04W 12/08* (2013.01); *H04W 12/72* (2021.01)

(58) Field of Classification Search
CPC ....... H04W 8/26; H04W 8/183; H04W 12/08; H04W 12/72
See application file for complete search history.

(56) References Cited

U.S. PATENT DOCUMENTS

| | | | | |
|---|---|---|---|---|
| 2022/0117015 | A1* | 4/2022 | DeFoy | ................. H04W 76/11 |
| 2024/0267783 | A1* | 8/2024 | Howe | ................. H04L 45/121 |

* cited by examiner

*Primary Examiner* — Wayne H Cai
(74) *Attorney, Agent, or Firm* — NICHOLSON DE VOS WEBSTER & ELLIOTT LLP

(57) ABSTRACT

Traffic is received at a distributed cloud computing network. The traffic originates from a computing device using a mobile data connection. The traffic is associated with an identifier that identifies a SIM of the computing device. Using the SIM identifier, an identity for identity-based policy enforcement at the distributed cloud computing network is determined. The identity is uniquely associated with the SIM identifier. An identity-based policy that is applicable for the received traffic for the determined identity is determined. The identity-based policy is enforced.

21 Claims, 6 Drawing Sheets

IDENTITY-BASED POLICY ENFORCEMENT FOR SIM DEVICES

CROSS-REFERENCE TO RELATED APPLICATIONS

This application claims the benefit of U.S. Provisional Application No. 63/377,189, filed Sep. 26, 2022, which is hereby incorporated by reference.

FIELD

Embodiments of the invention relate to the field of network security; and more specifically, to an identity-based policy enforcement for SIM devices.

BACKGROUND

Mobile devices outnumber personal computers by an order of magnitude. Many organizations have data that can be accessed by mobile devices which have become a threat vector for illegally accessing corporate data. Security for mobile devices is typically not as robust as personal computers, especially for unmanaged devices (devices that do not belong to the company). Zero trust solutions exist for mobile devices but are at the software layer. These software solutions can be difficult to install and manage, especially for unmanaged devices.

Many mobile devices include a Subscriber Identification Module (SIM) that stores the international mobile subscriber identity (IMSI) number and related keys. A SIM is conventionally used for identifying and authenticating subscribers for mobile access. A SIM may be included on a removable card (a universal integrated circuit card (UICC)), included on an embedded SIM (eSIM) (known as an embedded UICC), or included on an integrated SIM (iSIM) (known as an integrated UICC). An eSIM and iSIM are dynamically programmable.

SUMMARY

In some aspects, the techniques described herein relate to a method, including: receiving a domain name system (DNS) query at a distributed cloud computing network, wherein the DNS query originates from a computing device using a mobile data connection, wherein the DNS query is associated with an identifier of a subscriber identification module (SIM) of the computing device; determining, using the SIM identifier, an identity for identity-based policy enforcement at the distributed cloud computing network; determining a DNS policy that is applicable for the determined identity and DNS query; enforcing the DNS policy to determine whether the DNS query is allowed to be resolved for the determined identity; receiving, at the distributed cloud computing network, a request to access a private application, wherein the request to access the private application originates from the computing device using the mobile data connection, wherein the request to access the private application is associated with the SIM identifier of the computing device; determining an access policy that is applicable for the determined identity and private application; enforcing the access policy to determine whether the determined identity is allowed to access the private application; receiving first IP traffic at the distributed cloud computing network that has a first IP destination, the first IP traffic originating from the computing device using the mobile data connection, wherein the first IP traffic is associated with the first SIM identifier of the computing device; determining a first network policy that is applicable for the determined identity and first IP destination; enforcing the first network policy to determine whether the first IP traffic is allowed to be transmitted to the first IP destination for the determined identity; responsive to determining that the first IP traffic is not allowed to be transmitted to the first IP destination for the determined identity, blocking the first IP traffic from being transmitted to the first IP destination; receiving second IP traffic at the distributed cloud computing network that has a second IP destination, the second IP traffic originating from the computing device using the mobile data connection, wherein the second IP traffic is associated with the first SIM identifier of the computing device; determining a second network policy that is applicable for the determined identity and second IP destination; enforcing the second network policy to determine whether the second IP traffic is allowed to be transmitted to the second IP destination for the determined identity; responsive to determining that the second IP traffic is allowed to be transmitted to the second IP destination for the determined identity, causing the second IP traffic to be transmitted to the second IP destination; receiving HTTP traffic at the distributed cloud computing network, the HTTP traffic originating from the computing device using the mobile data connection, wherein the HTTP traffic is associated with the SIM identifier of the computing device; determining an HTTP policy that is applicable for the determined identity and HTTP traffic; and enforcing the HTTP policy to determine whether HTTP traffic is allowed to be transmitted to its destination for the determined identity. In some aspects, the techniques described herein relate to a non-transitory machine-readable storage medium that provides instructions that, when executed by a processor causes the method to be performed. In some aspects, the techniques described herein relate to a server, including: a processor; and a non-transitory machine-readable storage medium that provides instructions that, when executed by the processor causes the method to be performed.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A system for identity-based policy enforcement for an identity bound SIM device is described. A computing device (e.g., a mobile device) includes a SIM bound with an identity and is configured to send data traffic to an identity-based policy enforcement system. The SIM can be on a removable SIM card (e.g., a Universal Integrated Circuit Card (UICC)), on an eSIM (e.g., an Embedded Universal Integrated Circuit Card (eUICC)), or on an integrated SIM (iSIM). The SIM causes data traffic to be received at a distributed cloud computing network that enforces identity-based policies (e.g., zero trust policies). Each SIM is uniquely associated with an identity (e.g., a user identity, a device identity, a machine identity) that is used by the distributed cloud computing network for enforcing the identity-based policies. This computing device is sometimes called a zero trust SIM device in this description. In addition to enforcing identity-based policies, the distributed cloud computing network may enforce other policies and/or provide other services.

The distributed cloud computing network enforces identity-based policies including one or more of the following: Domain Name System (DNS) filtering on DNS requests received from the zero trust SIM device; enforcing policies to control network-level traffic received from the zero trust SIM device (e.g., layer 3 and/or layer 4 policies); enforcing policies to control application-level traffic received from the zero trust SIM device (e.g., HTTP, other layer 7 traffic); enforcing policies to secure inbound traffic to private applications or services; and enforcing policies to enforce browser isolation sessions for traffic received from the zero trust SIM device. The policies can include identity, device posture, location, and/or risk signals.

Figure 1:
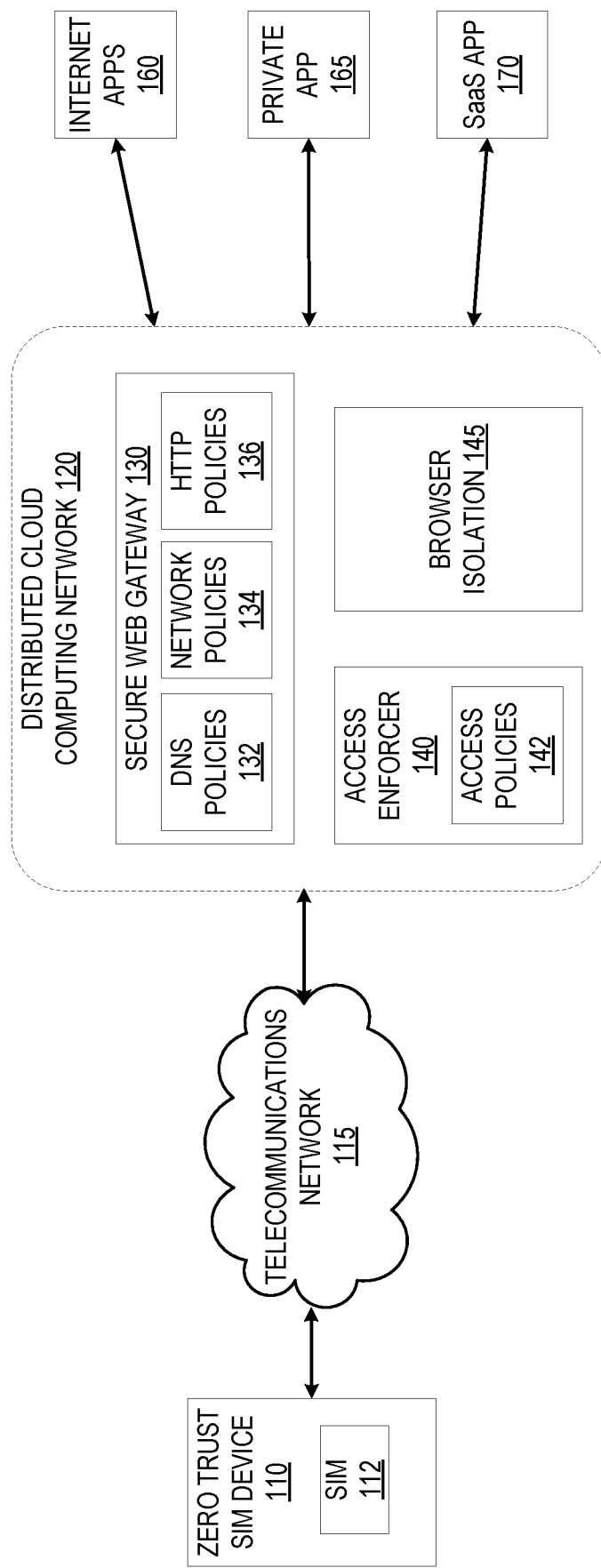
FIG. 1 illustrates an exemplary system for identity-based policy enforcement for an identity bound SIM device according to an embodiment.

FIG. 1 illustrates an exemplary system for identity-based policy enforcement for an identity bound SIM device according to an embodiment. The system includes a distributed cloud computing network 120 that enforces identity-based policies (e.g., zero trust policies) and may enforce other policies and/or provide other services. As illustrated in FIG. 1, the distributed cloud computing network 120 includes a secure web gateway 130, the application access enforcer 140, and browser isolation 145. Embodiments may include less of these components.

The distributed cloud computing network 120 may include multiple data centers (not illustrated in FIG. 1) that each can include multiple compute servers. There may be hundreds to thousands of data centers, for example. The data centers are geographically distributed (e.g., throughout the world). Each data center may also include one or more control servers, one or more DNS servers, and/or one or more other pieces of network equipment such as router(s), switch(es), and/or hub(s). In an embodiment, each compute server within a data center may process network traffic (e.g., DNS, TCP, UDP, HTTP/S, SPDY, FTP, TCP, UDP, IPSec, SIP, or other IP protocol traffic). For example, each compute server can perform the functions as described with respect to FIG. 1.

The zero trust SIM device 110 includes a SIM 112 (e.g., included on a removable SIM card (UICC), on an eUICC, or on an iUICC) that configures the zero trust SIM device 110 to send mobile data traffic through the telecommunications network 115 to be received at the distributed cloud computing network 120. The telecommunications network 115 may include a radio access network (RAN) and a packet core network (core). The zero trust SIM device 110 may be any type of computing device that is configurable with a SIM such as a mobile phone, an IoT device, a hotspot device, a dongle, a wearable device, a laptop, a desktop, and a tablet. If the SIM 112 is a removable SIM card, the card may be manufactured such that all data traffic (e.g., all DNS requests, all layer 3, layer 4, and layer 7 traffic, etc.) is received at the distributed cloud computing network 120. In the case the SIM 112 is an eSIM or iSIM, it may be dynamically programmed such that all data traffic (e.g., all DNS requests, all layer 3, layer 4, and layer 7 traffic, etc.) is received at the distributed cloud computing network 120. The programming may be done through scanning a QR code, through mobile device management (MDM), or through a software agent installed on the zero trust SIM device 110.

The SIM 112 is uniquely associated with one or more identities (e.g., a user identity, a device identity, or machine identity) for use in identity-based policy enforcement. For example, during provisioning of the SIM 112, a set of one or more identifiers that uniquely identify the SIM 112 including an international mobile subscriber identity (IMSI), integrated circuit card identification number (ICCID), mobile station integrated services digital network (MSISDN), and/or a custom device identifier) (sometimes referred herein as a SIM identifier) is associated with an identity (e.g., a user identity, a device identity, a machine identity) at the distributed cloud computing network 120. In an embodiment, the custom device identifier is created by the distributed cloud computing network 120 (e.g., during provisioning) and can be associated with one or more identifiers used by the carrier or network provider of the telecommunications network 115 (e.g., one or more of ISMI, ICCID, MSISDN, or custom network provided identifier). The custom drive identifier can be used to track a unique SIM and device across networks and network profiles so that policies can be consistently applied. When receiving a packet with the SIM identifier, the distributed cloud computing network 120 does a lookup to map the identifier included in the packet with the custom device identifier. The custom device identifier is then used to determine the identity and applicable policy(ies).

The SIM identifier may also be associated with an organization identifier of which the identity is a member. For instance, the SIM identifier may be associated with an organization identifier that identifies an employer and an identity that identifies an employee of that employer (e.g., an email address, a username, etc.). The SIM identifier may be included in each request sent by the zero trust SIM device 110.

In an embodiment, an organization (e.g., an employer) configures the zero trust SIM device 110 for use by a member of the organization (e.g., an employee) or allows the member to configure the zero trust SIM device 110. The organization may also define the identity-based policies and/or other security policies enforced at the distributed cloud computing network 120.

The secure web gateway 130 allows a customer of the service to create policies to inspect DNS queries and control the domains that resolve, inspect network traffic (e.g., layer 3 and layer 4) to control IP addresses and/or ports that can connect, and/or inspect application-level traffic (e.g., layer 7 traffic such as HTTP/S traffic). These policies can include identity, device posture, location, and/or risk signals. For example, an identity-based network policy may be used to control access to non-HTTP resources on a per-user (or per-identity). Thus, the secure web gateway can enforce DNS policies 132, network policies 134, and/or HTTP policies 136.

The DNS policies 132 allow for DNS filtering on DNS requests received from the zero trust SIM device 110. A DNS policy may specify the domains or category of domains that are allowed or not allowed. If a DNS request is received for a domain that is not allowed, the DNS query will not be allowed to resolve. If a DNS request is received for a domain that is allowed, the DNS query will be allowed to resolve and the answer may be returned to the zero trust SIM device 110. A DNS policy may be identity-based.

The network policies 134 allow for controlling network-level traffic (e.g., layer 3 and/or layer 4) leaving the zero trust SIM device 110. An example network policy includes an action (e.g., allow, block), a rule selector that defines the criteria for matching traffic (e.g., destination IP address, destination port, source IP address, source port, protocol, destination location), a rule operator for matching traffic to a selector (e.g., is, is not, in, not in, etc.), and value(s). A network policy may include identity-based conditions that can control access on a per identity basis. A network policy can also include device posture (e.g., to require devices to have certain software installed or other configuration attributes) and/or include risk signals.

The HTTP policies 136 allow for inspection of HTTP/S requests and block or allow specific elements such as websites, IP addresses, and/or file types such as the internet applications 160. An example HTTP policy includes an action (e.g., allow, block, isolate), a rule selector that defines the criteria for matching traffic (e.g., destination IP address, source IP address, domain, destination location, source location, users), a rule operator for matching traffic to a selector (e.g., is, is not, in, not in, etc.), and value(s). An HTTP policy may include identity-based conditions that can control access on a per identity basis. An HTTP policy can also include device posture (e.g., to require devices to have certain software installed or other configuration attributes) and/or include risk signals. An HTTP policy may include a data loss prevention (DLP) policy to inspect the HTTP traffic for the presence of sensitive data such as social security numbers and/or credit card numbers.

As described above, a DNS policy, network policy, and/or HTTP policy (or other layer 7 policy) can be identity-based. An identity-based selector can be used with these policies to specify the identity type and value (e.g., email and value, group identifier and value, group email and value, username and value, device identifier and value, SIM identifier and value).

The distributed cloud computing network 120 may include the application access enforcer 140. The application access enforcer 140 allows a customer of the service (e.g., an organization) to create and configure a set of one or more access policies 142. The access policies 142 define criteria that a user and/or device must meet to access a private application such as the private application 165 and/or access a public application such as the SaaS application 170. As an example, an access policy includes an action (e.g., allow, block, alert), rule types (e.g., include, exclude, require), a rule selector that defines the criteria for users/devices to meet, and value(s). An access policy may include identity-based access rules and/or non-identity based access rules. An identity-based access rule is based on the identity information associated with the request from the zero trust SIM device 110. Example rule selectors that are identity-based include access groups, email address, and emails ending in a specified domain. For instance, an identity-based access rule may define email addresses or groups of email addresses (e.g., all emails ending in @example.com) that are allowed and/or not allowed. A non-identity based access rule is a rule that is not based on identity. Examples include rules based on location (e.g., geographic region such as the country of origin), device posture, time of request, type of request, IP address, multifactor authentication status, multifactor authentication type, type of device, type of client network application, whether the request is associated with a zero trust SIM device, an external evaluation rule, and/or other layer 3, layer 4, and/or layer 7 policies.

The browser isolation 145 allows webpage content to be executed in a secure isolated browser. For example, an HTTP policy 136 may include an isolate action to enable a remote browsing session for a certain website or content. As an example, an HTTP policy 136 may be created to isolate all websites that have been determined to be a security threat (e.g., suspected malware, suspected phishing, suspected spam, suspected spyware, suspected DNS tunneling site, etc.). As another example, an HTTP policy 136 may be created to isolate a specific host. As another example, an HTTP policy 136 may be created to isolate all hosts that are not listed.

The distributed cloud computing network 120 may perform other security functions and/or performance functions. For example, the distributed cloud computing network 120 may perform denial of service detection and mitigation, perform bot detection and mitigation, perform intrusion detection and mitigation, and perform anomaly detection and mitigation.

In an embodiment, the SIM 112 stores cryptographic keys that allow the distributed cloud computing network 120 to trust connections originating from a zero trust SIM device. This can be used as an additional factor in the identity evaluation rules of the policies.

In an embodiment, the distributed cloud computing network 120 increases the level of trust from requests received from the zero trust SIM device 110. This level of trust may be fed into other functions of the distributed cloud computing network 120 including bot detection/mitigation. For instance, a request received from a zero trust SIM device 110 has a strong likelihood of coming from a human user and not a bot. This reduces the likelihood of the user being prompted with a CAPTCHA or other ways of confirming the request is from a human user and not a bot.

In an embodiment, the distributed cloud computing network 120 locks the SIM 112 with the zero trust SIM device 110 (e.g., associating the SIM identifier with the IMEI). If traffic is received from a SIM that does not match the locked identifier, the traffic will be discarded.

As earlier described, data traffic from the zero trust SIM device 110 is received at the distributed cloud computing network 120. In an embodiment, a compute server of the distributed cloud computing network 120 operates at the data network (DN) and connects to a server of the telecommunications network 115 at the user plane function (UPF). A layer 2 or layer 3 tunnel may connect the telecommunications network 115 with the distributed cloud computing network 120. For instance, a GRE tunnel may connect a router or server of the telecommunications network 115 (e.g., at the user plane function) with a GRE interface at a compute server of the distributed cloud computing network 120.

Figure 2:
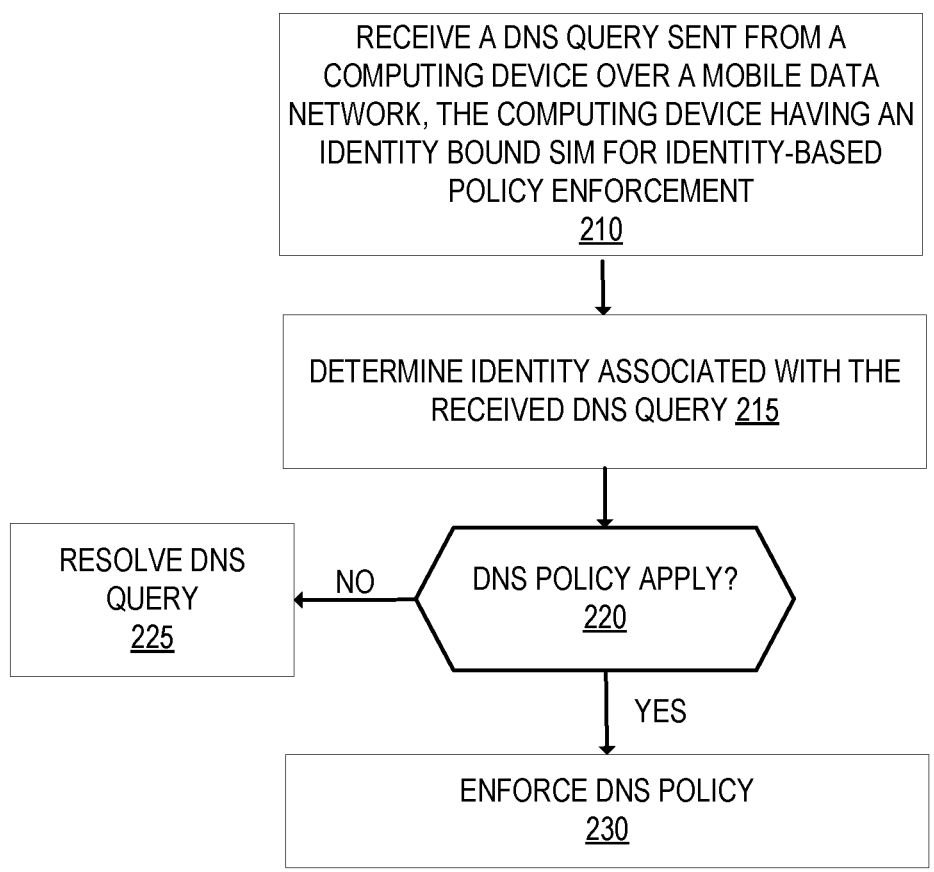
FIG. 2 is a flow diagram that illustrates exemplary operations for identity-based policy enforcement for DNS traffic received from an identity bound SIM device according to an embodiment.

FIG. 2 is a flow diagram that illustrates exemplary operations for identity-based policy enforcement for DNS traffic received from an identity bound SIM device according to an embodiment. The operations of FIG. 2 and the other flow diagrams are described with respect to the exemplary embodiment of FIG. 1. However, the operations of FIG. 2 and the other flow diagrams can be performed by embodiments different from FIG. 1, and the embodiment of FIG. 1 can perform operations different from FIG. 2 and the other flow diagrams.

At operation 210, a secure web gateway 130 of the distributed cloud computing network 120 receives a DNS query sent from a computing device over a mobile data network, where the computing device has an identity bound SIM for identity-based policy enforcement. The computing device is configured in such a way that mobile data traffic, including DNS queries, is received at the distributed cloud computing network 120. For example, a DNS query is received from the zero trust SIM device 110. A unique identifier of the SIM 112 is received with or included in the DNS query. The unique identifier of the SIM 112 that is received may be configured by the operator of the telecommunications network 115. The unique identifier may be, for example, an IMSI, ICCID, MSISDN, and/or a custom network provided identifier.

The SIM 112 is bound to an identity that is used for identity-based policy enforcement. At operation 215, the secure web gateway 130 determines the identity associated with the received DNS query. In an embodiment, the secure web gateway 130 uses the unique SIM identifier of the SIM 112 to perform a lookup of the organization identifier and identity associated with the SIM identifier. As an example where a custom device identifier is used at the distributed cloud computing network 120, the secure web gateway 130 does a lookup from the unique identifier of the SIM 112 in the DNS query to determine the mapped custom device identifier, and then uses the custom device identifier to perform a lookup of the organization identifier and identity associated with the SIM identifier. The identity may be tied to a user or a device. The identity may belong to one or more groupings (e.g., department identifier, group email, etc.). As an example, the SIM identifier may be associated (directly or indirectly) with an employee in the legal department of a company.

Next, at operation 220, the secure web gateway 130 determines whether a DNS policy is applicable for the received DNS request for the determined identity. For example, the secure web gateway 130 determines whether there is a DNS policy that is configured or applied by the organization and is applicable to the determined identity. The DNS policy may specify the domains or category of domains that are allowed or not allowed. If a DNS policy is not applicable, then at operation 225 the DNS query is resolved. For instance, the secure web gateway 130 may cause the DNS query to be transmitted to a DNS resolver (not shown in the figures) for resolving the DNS query. The response to the DNS query is transmitted back to the zero trust SIM device 110. If a DNS policy is applicable, then at operation 230 the secure web gateway 130 enforces the DNS policy. Enforcing the DNS policy depends on how the policy is configured (e.g., allow, block, override, etc.). If the policy does not allow the DNS query to be resolved, then the secure web gateway 130 does not resolve the DNS query. The secure web gateway 130 may cause a block page or other error page to the requesting zero trust SIM device 110 in such a case. If the policy allows for the DNS query to be resolved, then the secure web gateway 130 causes the DNS query to be resolved like in operation 225.

Figure 3:
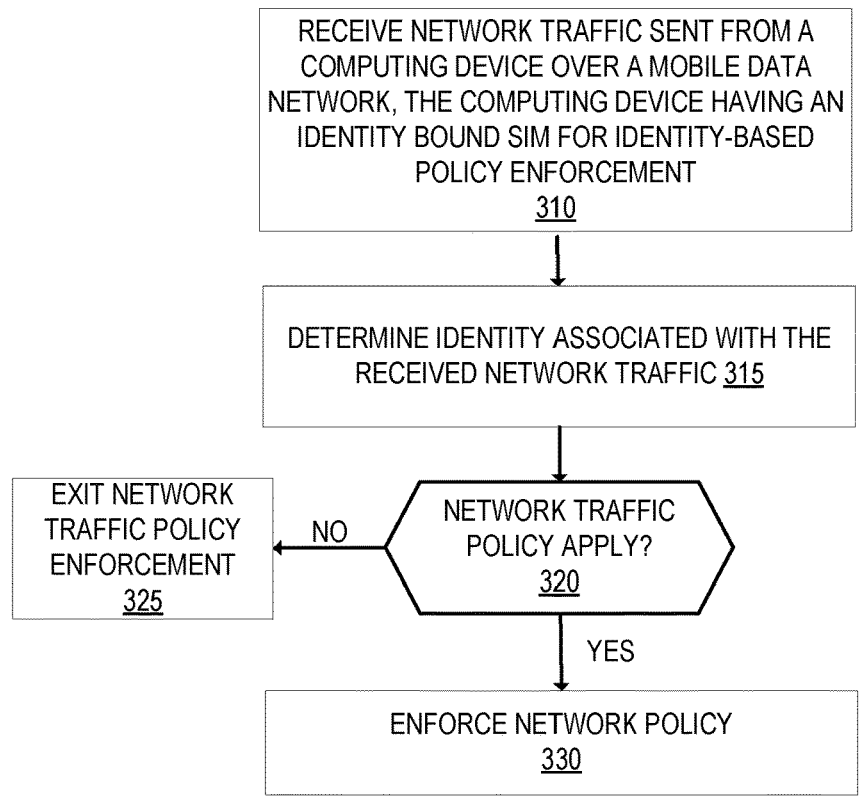
FIG. 3 is a flow diagram that illustrates exemplary operations for identity-based policy enforcement for network traffic received from an identity bound SIM device according to an embodiment.

FIG. 3 is a flow diagram that illustrates exemplary operations for identity-based policy enforcement for network traffic received from an identity bound SIM device according to an embodiment. At operation 310, the secure web gateway 130 of the distributed cloud computing network 120 receives network traffic sent from a computing device over a mobile data network, where the computing device has an identity bound SIM for identity-based policy enforcement. The computing device is configured in a way such that mobile data traffic, including network traffic (e.g., layer 3 and/or layer 4 traffic), is received at the distributed cloud computing network 120. For example, IP/TCP and/or IP/UDP traffic is received from the zero trust SIM device 110. A unique identifier of the SIM 112 is received with or included in the network traffic. The unique identifier of the SIM 112 that is received may be configured by the operator of the telecommunications network 115. The unique identifier may be, for example, an IMSI, ICCID, MSISDN, and/or a custom network provided identifier. As an example for this flow diagram, the received traffic has a destination to an internet application 160.

The SIM 112 is bound to an identity that is used for identity-based policy enforcement. At operation 315, the secure web gateway 130 determines the identity associated with the received network traffic. In an embodiment, the secure web gateway 130 uses the unique SIM identifier of the SIM 112 to perform a lookup of the organization identifier and identity associated with the SIM identifier. As an example where a custom device identifier is used at the distributed cloud computing network 120, the secure web gateway 130 does a lookup from the unique identifier of the SIM 112 in the DNS query to determine the mapped custom device identifier, and then uses the custom device identifier to perform a lookup of the organization identifier and identity associated with the SIM identifier. The identity may be tied to a user or a device. The identity may belong to one or more groupings (e.g., department identifier, group email, etc.).

Next, at operation 320, the secure web gateway 130 determines whether a network policy 134 is applicable for the received network traffic for the determined identity. For example, the secure web gateway 130 determines whether there is a network policy 134 that is configured or applied by the organization and is applicable to the determined identity. A network policy allows for controlling network-level traffic (e.g., layer 3 and/or layer 4) leaving the zero trust SIM device 110. An example network policy includes an action (e.g., allow, block), a rule selector that defines the criteria for matching traffic (e.g., destination IP address, destination port, source IP address, source port, protocol, destination location), a rule operator for matching traffic to a selector (e.g., is, is not, in, not in, etc.), and value(s). A network policy may include identity-based conditions that can control access on a per identity basis. For example, an identity-based selector can be used with the network policy to specify the identity type and value (e.g., email and value, group identifier and value, group email and value, username and value, device identifier and value, SIM identifier and value). A network policy can also include device posture (e.g., to require devices to have certain software installed or other configuration attributes) and/or include risk signals. In this example, the secure web gateway 130 determines whether traffic from the zero trust SIM device 110 (and under what conditions) is allowed to be transmitted to the internet application 160.

If a network policy is not applicable, then at operation 325 the network traffic policy enforcement ends. If a network policy is applicable, then at operation 330 the secure web gateway 130 enforces the network policy. Enforcing the network policy depends on how the policy is configured. For example, enforcing the network policy may include determining whether the network traffic, the zero trust SIM device 110, and/or the identity associated with the zero trust SIM device 110, meet the condition(s) in the policy for accessing the destination. If, for example, the policy does not allow the network traffic to be transmitted to the destination (e.g., the request, the zero trust SIM device 110, and/or the identity associated with the zero trust SIM device 110 does not meet all required condition(s) in the policy), then the secure web gateway 130 does not allow the traffic to be transmitted. The secure web gateway 130 may cause a block page or other error page to the requesting zero trust SIM device 110 in such a case. If the policy allows for the network traffic to be sent to the destination, then the secure web gateway 130 causes the network traffic to be transmitted to the destination (assuming that any other policy also permits the traffic in question to be sent to the destination).

Figure 4:
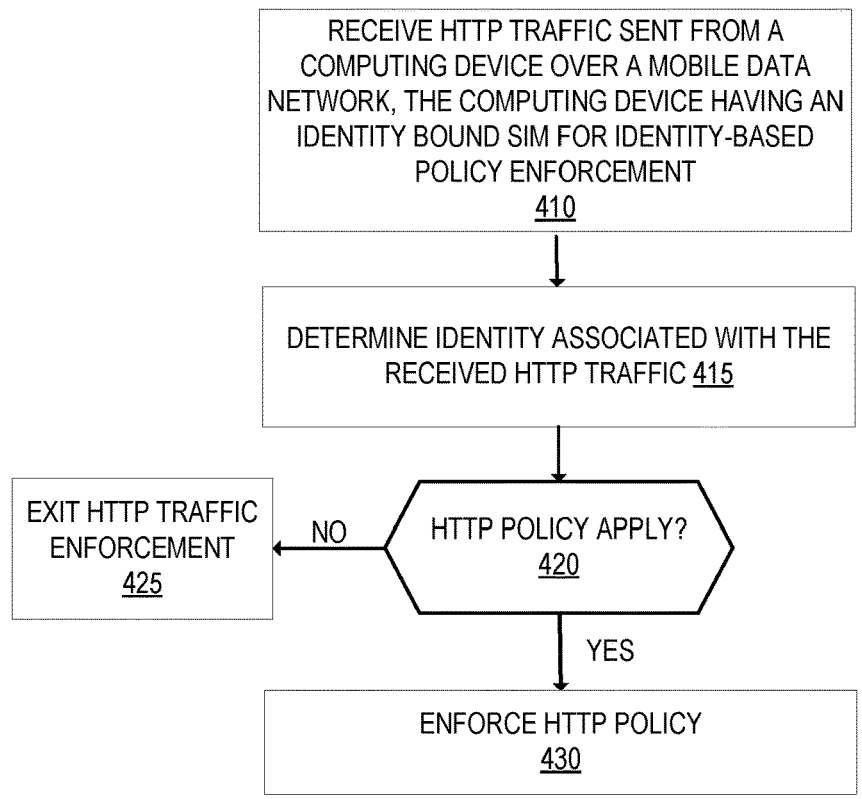
FIG. 4 is a flow diagram that illustrates exemplary operations for identity-based policy enforcement for HTTP traffic received from an identity bound SIM device according to an embodiment.

FIG. 4 is a flow diagram that illustrates exemplary operations for identity-based policy enforcement for HTTP traffic received from an identity bound SIM device according to an embodiment. The operations of FIG. 4 refer to HTTP traffic. However, like operations may be performed for other application-level traffic.

At operation 410, the secure web gateway 130 of the distributed cloud computing network 120 receives HTTP traffic sent from a computing device over a mobile data network, where the computing device has an identity bound SIM for identity-based policy enforcement. The computing device is configured in a way such that mobile data traffic, including HTTP traffic (or other layer 7 traffic), is received at the distributed cloud computing network 120. A unique identifier of the SIM 112 is received with or included in the HTTP traffic. The unique identifier of the SIM 112 that is received may be configured by the operator of the telecommunications network 115. The unique identifier may be, for example, an IMSI, ICCID, MSISDN, and/or a custom network provided identifier. As an example for this flow diagram, the received HTTP traffic has a destination to an internet application 160.

The SIM 112 is bound to an identity that is used for identity-based policy enforcement. At operation 415, the secure web gateway 130 determines the identity associated with the received HTTP traffic. In an embodiment, the secure web gateway 130 uses the unique SIM identifier of the SIM 112 to perform a lookup of the organization identifier and identity associated with the SIM identifier. As an example where a custom device identifier is used at the distributed cloud computing network 120, the secure web gateway 130 does a lookup from the unique identifier of the SIM 112 in the DNS query to determine the mapped custom device identifier, and then uses the custom device identifier to perform a lookup of the organization identifier and identity associated with the SIM identifier. The identity may be tied to a user or a device. The identity may be tied to a user or a device. The identity may belong to one or more groupings (e.g., department identifier, group email, etc.).

Next, at operation 420, the secure web gateway 130 determines whether an HTTP policy 136 is applicable for the received network traffic for the determined identity. For example, the secure web gateway 130 determines whether there is an HTTP policy 136 that is configured or applied by the organization and is applicable to the determined identity. An HTTP policy blocks or allows specific elements such as websites, IP addresses, and/or file types such as the internet applications 160. An example HTTP policy includes an action (e.g., allow, block, isolate), a rule selector that defines the criteria for matching traffic (e.g., destination IP address, source IP address, domain, destination location, source location, users), a rule operator for matching traffic to a selector (e.g., is, is not, in, not in, etc.), and value(s). An HTTP policy may include identity-based conditions that can control access on a per identity basis. For example, an identity-based selector can be used with the HTTP policy to specify the identity type and value (e.g., email and value, group identifier and value, group email and value, username and value, device identifier and value, SIM identifier and value). An HTTP can also include device posture (e.g., to require devices to have certain software installed or other configuration attributes) and/or include risk signals. An HTTP policy may include a data loss prevention (DLP) policy to inspect the HTTP traffic for the presence of sensitive data such as social security numbers and/or credit card numbers.

If an HTTP policy is not applicable, then at operation 425 the HTTP traffic policy enforcement ends. If an HTTP policy is applicable, then at operation 430 the secure web gateway 130 enforces the HTTP policy. Enforcing the HTTP policy depends on how the policy is configured. For example, enforcing the HTTP policy may include determining whether the HTTP traffic, the zero trust SIM device 110, and/or the identity associated with the zero trust SIM device 110, meet the condition(s) in the policy for accessing the destination. If, for example, the policy does not allow the HTTP traffic to be transmitted to the destination (e.g., the request, the zero trust SIM device 110, and/or the identity associated with the zero trust SIM device 110 does not meet all required condition(s) in the policy), then the secure web gateway 130 does not allow the HTTP traffic to be transmitted. The secure web gateway 130 may cause a block page or other error page to the requesting zero trust SIM device 110 in such a case. If the policy allows for the HTTP traffic to be sent to the destination, then the secure web gateway 130 causes the HTTP traffic to be transmitted to the destination (assuming that any other policy also permits the traffic in question to be sent to the destination).

Figure 5:
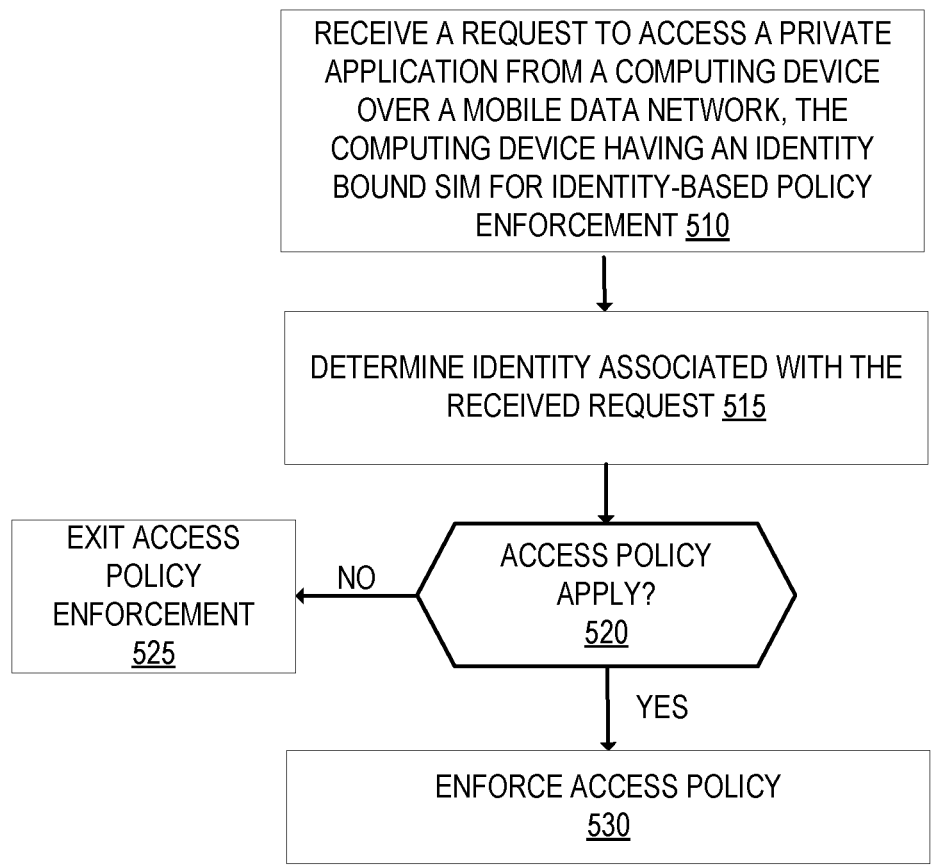
FIG. 5 is a flow diagram that illustrates exemplary operations for identity-based policy enforcement for a request to access an application received from an identity bound SIM device according to an embodiment.

FIG. 5 is a flow diagram that illustrates exemplary operations for identity-based policy enforcement for a request to access an application received from an identity bound SIM device according to an embodiment. The operations of FIG. 5 refer to a request to access a private application such as the private application 165. However, like operations may be performed for a request to access a public application such as a SaaS application 170.

At operation 510, application access enforcer 140 of the distributed cloud computing network 120 receives a request to access an application from a computing device over a mobile data network, where the computing device has an identity bound SIM for identity-based policy enforcement. The computing device is configured in such a way that mobile data traffic, including requests for access, is received at the distributed cloud computing network 120. A unique identifier of the SIM 112 is received with or included in the request. The unique identifier of the SIM 112 that is received may be configured by the operator of the telecommunications network 115. The unique identifier may be, for example, an IMSI, ICCID, MSISDN, and/or a custom network provided identifier. As an example for this flow diagram, the request is to access a private application 165. The private application 165 is protected by the application access enforcer 140. For example, the application access enforcer 140 enforces the set of access policies 142 that are configured for accessing the private application 165. If the condition(s) of the set of access policies 142 are not met, the request is denied.

The SIM 112 is bound to an identity that is used for identity-based policy enforcement. At operation 515, the application access enforcer 140 determines the identity associated with the received request. In an embodiment, the application access enforcer 140 uses the unique SIM identifier of the SIM 112 to perform a lookup of the organization identifier and identity associated with the SIM identifier. As an example where a custom device identifier is used at the distributed cloud computing network 120, the application access enforcer 140 does a lookup from the unique identifier of the SIM 112 in the DNS query to determine the mapped custom device identifier, and then uses the custom device identifier to perform a lookup of the organization identifier and identity associated with the SIM identifier. The identity may be tied to a user or a device. The identity may belong to one or more groupings (e.g., department identifier, group email, etc.).

Next, at operation 520, the application access enforcer 140 determines whether an access policy 142 is applicable for the received request for the determined identity. For example, the application access enforcer 140 determines whether there is an access policy 142 that is configured or applied by the organization and is applicable to the determined identity. An access policy defines criteria that a user and/or device must meet to access a private application such as the private application 165 and/or access a public application such as the SaaS application 170. As an example, an access policy includes an action (e.g., allow, block, alert), rule types (e.g., include, exclude, require), a rule selector that defines the criteria for users/devices to meet, and value(s). An access policy may include identity-based access rules and/or non-identity based access rules. An identity-based access rule is based on the identity information associated with the request from the zero trust SIM device 110. Example rule selectors that are identity-based include access groups, email address, and emails ending in a specified domain. For instance, an identity-based access rule may define email addresses or groups of email addresses (e.g., all emails ending in @example.com) that are allowed and/or not allowed. An identity-based selector can be used with the access policy to specify the identity type and value (e.g., email and value, group identifier and value, group email and value, username and value, device identifier and value, SIM identifier and value). A non-identity based access rule is a rule that is not based on identity. Examples include rules based on location (e.g., geographic region such as the country of origin), device posture, time of request, type of request, IP address, multifactor authentication status, multifactor authentication type, type of device, type of client network application, whether the request is associated with a zero trust SIM device, an external evaluation rule, and/or other layer 3, layer 4, and/or layer 7 policies.

If an access policy is not applicable, then at operation 525 the access policy enforcement ends. If all other applicable policy(ies) are met, the request is transmitted to the application. If an access policy is applicable, then at operation 530 the application access enforcer 140 enforces the access policy. Enforcing the access policy depends on how the policy is configured. For example, enforcing the access policy may include determining whether the request, the zero trust SIM device 110, and/or the identity associated with the zero trust SIM device 110, meet the condition(s) in the policy for accessing the application. If, for example, the policy does not allow access to the application (e.g., the request, the zero trust SIM device 110, and/or the identity associated with the zero trust SIM device 110 does not meet all required condition(s) in the policy), then the application access enforcer 140 does not allow the request to be transmitted to the application. The application access enforcer 140 may cause a block page or other error page to the requesting zero trust SIM device 110 in such a case. If the policy allows the application to be accessed (e.g., the request, the zero trust SIM device 110, and/or the identity associated with the zero trust SIM device 110 meet the condition(s) in the policy for accessing the application), then the application access enforcer 140 allows access to the private application (assuming all other applicable policy(ies) permit the request to be transmitted to the private application). For example, the request for access may be transmitted to the private application.

Figure 6:
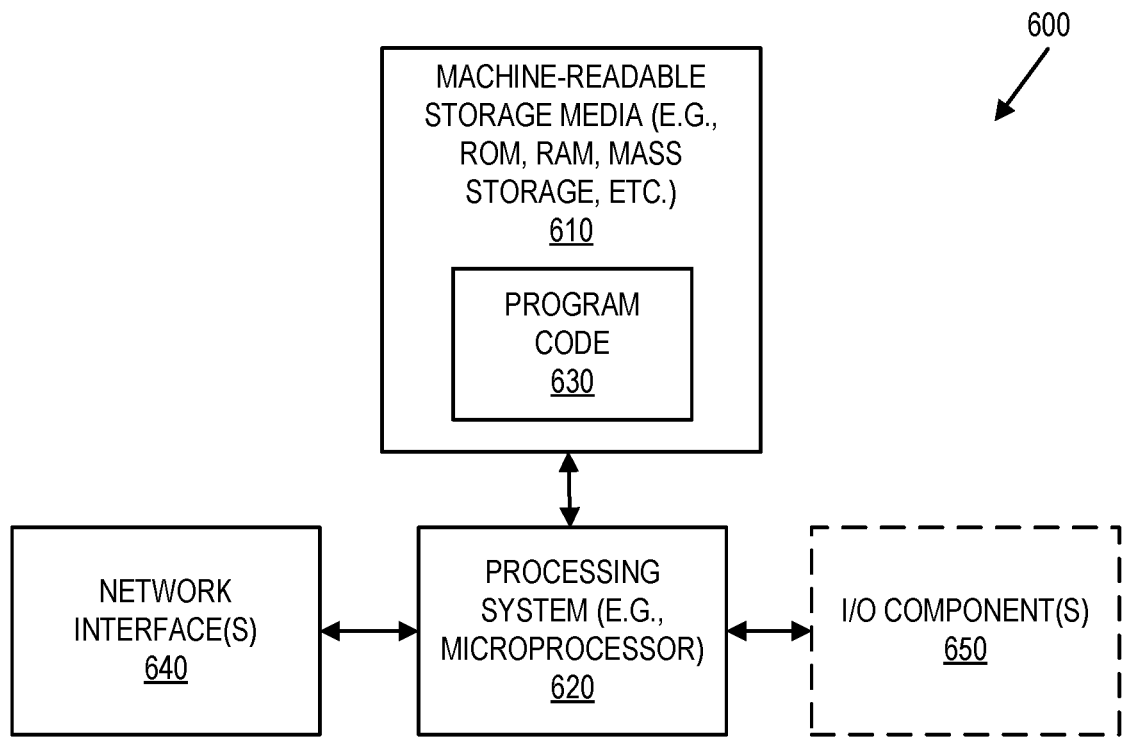
FIG. 6 illustrates a block diagram for an exemplary data processing system that may be used in some embodiments.

FIG. 6 illustrates a block diagram for an exemplary data processing system 600 that may be used in some embodiments. One or more such data processing systems 600 may be used to implement the embodiments and operations described with respect to the compute servers or other computing devices. The data processing system 600 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620 (e.g., one or more processors and connected system components such as multiple connected chips). For example, the depicted machine-readable storage media 610 may store program code 630 that, when executed by the processing system 620, causes the data processing system 600 to perform any of the operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). The data processing system 600 may also include one or more input or output ("I/O") components 650 such as a mouse, keypad, keyboard, a touch panel or a multi-touch input panel, camera, other known I/O devices or a combination of such I/O devices. Additional components, not shown, may also be part of the system 600, and, in certain embodiments, fewer components than that shown are used. One or more buses may be used to interconnect the various components shown in FIG. 6.

Figure 7:
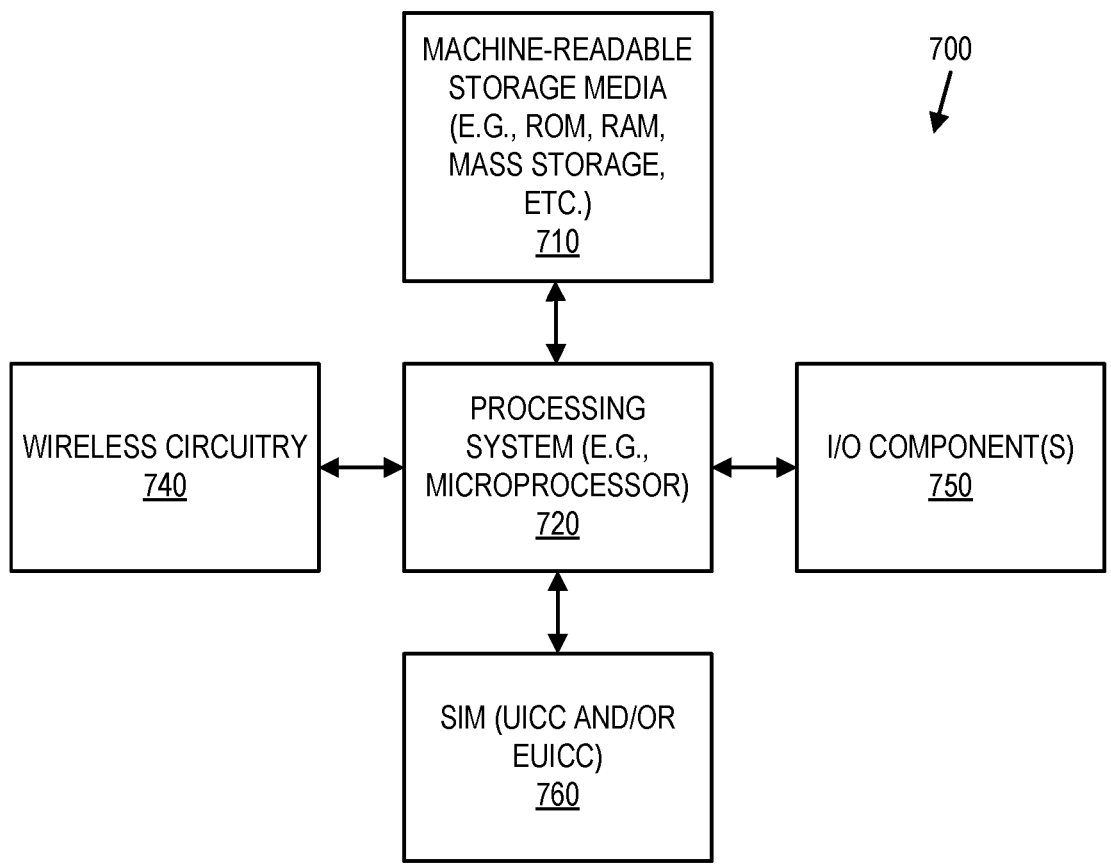
FIG. 7 illustrates a block diagram for an exemplary data processing system that may be used in some embodiments.

FIG. 7 illustrates a block diagram for an exemplary data processing system 700 that may be used in some embodiments. One or more such data processing systems 700 may be used to implement the embodiments and operations described with respect to the zero trust SIM device. The data processing system 700 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 720 (e.g., one or more processors and connected system components such as multiple connected chips).

The data processing system 700 also includes the wireless circuitry 740 that allows the data processing system 700 to transmit data and receive data across a wireless network such as the telecommunications network 115. The data processing system 700 also includes the SIM 760 that may be a UICC, eUICC, and/or iUICC. The SIM 760 is configured to send data traffic to the distributed cloud computing network 120. The data processing system 700 may also include one or more input or output ("I/O") components 750 such as a mouse, keypad, keyboard, a touch panel or a multi-touch input panel, camera, an audio input/output subsystem (which may include a microphone and/or a speaker), other known I/O devices or a combination of such I/O devices. Additional components, not shown, may also be part of the system 700, and, in certain embodiments, fewer components than that shown are used. One or more buses may be used to interconnect the various components shown in FIG. 7.

Although embodiments have been described with respect to a SIM application, similar operations can be performed for IP Multimedia Services Identity Module (ISIM) that is included on the UICC, eUICC, or iUICC. For instance, the ISIM may be uniquely associated with an identity (e.g., user identity, device identity, machine identity) that is used by the distributed cloud computing network for enforcing the identity-based policies.

Although embodiments have been described as using the SIM for provisioning identity-based policy enforcement, similar operations can be done for using the SIM for provisioning security services in addition to, or instead of, identity-based policy enforcement. By way of example, the SIM identifier can be associated with an organizational identifier that is used by a cloud computing network such as the distributed cloud computing network to apply security services and/or other services that are not identity-based. For example, an organization may have a DNS filtering policy, a network policy, an HTTP policy that applies to all members or is otherwise not identity-based. As another example, the format of the SIM (e.g., UICC, eUICC, iUICC), the version of the SIM, and/or any applications running on the system including the keys running on the SIM, may be used by the distributed cloud computing network to apply network security. For example, a SIM that is implemented on an UICC (a removable SIM card) may have additional security policies compared to a SIM implemented on a eUICC.

The techniques shown in the figures can be implemented using code and data stored and executed on one or more computing devices (e.g., a compute server, a mobile device, etc.). Such computing devices store and communicate (internally and/or with other computing devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such computing devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving a domain name system (DNS) query at a distributed cloud computing network, wherein the DNS query originates from a computing device using a mobile data connection, wherein the DNS query is associated with an identifier of a subscriber identification module (SIM) of the computing device;
determining, using the SIM identifier, an identity for identity-based policy enforcement at the distributed cloud computing network;
determining a DNS policy that is applicable for the determined identity and DNS query;
enforcing the DNS policy to determine whether the DNS query is allowed to be resolved for the determined identity;

receiving, at the distributed cloud computing network, a request to access a private application, wherein the request to access the private application originates from the computing device using the mobile data connection, wherein the request to access the private application is associated with the SIM identifier of the computing device;

determining an access policy that is applicable for the determined identity and private application;

enforcing the access policy to determine whether the determined identity is allowed to access the private application;

receiving first IP traffic at the distributed cloud computing network that has a first IP destination, the first IP traffic originating from the computing device using the mobile data connection, wherein the first IP traffic is associated with the first SIM identifier of the computing device;

determining a first network policy that is applicable for the determined identity and first IP destination;

enforcing the first network policy to determine whether the first IP traffic is allowed to be transmitted to the first IP destination for the determined identity;

responsive to determining that the first IP traffic is not allowed to be transmitted to the first IP destination for the determined identity, blocking the first IP traffic from being transmitted to the first IP destination;

receiving second IP traffic at the distributed cloud computing network that has a second IP destination, the second IP traffic originating from the computing device using the mobile data connection, wherein the second IP traffic is associated with the first SIM identifier of the computing device;

determining a second network policy that is applicable for the determined identity and second IP destination;

enforcing the second network policy to determine whether the second IP traffic is allowed to be transmitted to the second IP destination for the determined identity;

responsive to determining that the second IP traffic is allowed to be transmitted to the second IP destination for the determined identity, causing the second IP traffic to be transmitted to the second IP destination;

receiving HTTP traffic at the distributed cloud computing network, the HTTP traffic originating from the computing device using the mobile data connection, wherein the HTTP traffic is associated with the SIM identifier of the computing device;

determining an HTTP policy that is applicable for the determined identity and HTTP traffic; and enforcing the HTTP policy to determine whether HTTP traffic is allowed to be transmitted to its destination for the determined identity.

2. The method of claim 1, further comprising:
responsive to determining that the DNS query is allowed to be resolved, resolving the DNS query, and transmitting a DNS response to the computing device.

3. The method of claim 1, further comprising:
responsive to determining that the determined identity is not allowed to access the private application, blocking the requested access.

4. The method of claim 1, further comprising:
responsive to determining that the determined identity is allowed to access the private application, causing the request to access the private application to be transmitted to the private application.

5. The method of claim 1, further comprising:
responsive to determining that the HTTP traffic is not allowed to be transmitted to its destination for the determined identity, blocking the HTTP traffic from being transmitted.

6. The method of claim 1, further comprising:
responsive to determining that the HTTP traffic is allowed to be transmitted to its destination for the determined identity, causing the HTTP traffic to be transmitted to its destination.

7. The method of claim 1, wherein the SIM is on a removable Universal Integrated Circuit Card (UICC) or on an Embedded Universal Integrated Circuit Card (EUICC).

8. A non-transitory machine-readable storage medium that provides instructions that, when executed by a processor causes operations to be performed including:

receiving a domain name system (DNS) query at a distributed cloud computing network, wherein the DNS query originates from a computing device using a mobile data connection, wherein the DNS query is associated with an identifier of a subscriber identification module (SIM) of the computing device;

determining, using the SIM identifier, an identity for identity-based policy enforcement at the distributed cloud computing network;

determining a DNS policy that is applicable for the determined identity and DNS query;

enforcing the DNS policy to determine whether the DNS query is allowed to be resolved for the determined identity;

receiving, at the distributed cloud computing network, a request to access a private application, wherein the request to access the private application originates from the computing device using the mobile data connection, wherein the request to access the private application is associated with the SIM identifier of the computing device;

determining an access policy that is applicable for the determined identity and private application;

enforcing the access policy to determine whether the determined identity is allowed to access the private application;

receiving first IP traffic at the distributed cloud computing network that has a first IP destination, the first IP traffic originating from the computing device using the mobile data connection, wherein the first IP traffic is associated with the first SIM identifier of the computing device;

determining a first network policy that is applicable for the determined identity and first IP destination;

enforcing the first network policy to determine whether the first IP traffic is allowed to be transmitted to the first IP destination for the determined identity;

responsive to determining that the first IP traffic is not allowed to be transmitted to the first IP destination for the determined identity, blocking the first IP traffic from being transmitted to the first IP destination;

receiving second IP traffic at the distributed cloud computing network that has a second IP destination, the second IP traffic originating from the computing device using the mobile data connection, wherein the second IP traffic is associated with the first SIM identifier of the computing device;

determining a second network policy that is applicable for the determined identity and second IP destination;

enforcing the second network policy to determine whether the second IP traffic is allowed to be transmitted to the second IP destination for the determined identity;

responsive to determining that the second IP traffic is allowed to be transmitted to the second IP destination for the determined identity, causing the second IP traffic to be transmitted to the second IP destination;

receiving HTTP traffic at the distributed cloud computing network, the HTTP traffic originating from the computing device using the mobile data connection, wherein the HTTP traffic is associated with the SIM identifier of the computing device;

determining an HTTP policy that is applicable for the determined identity and HTTP traffic; and enforcing the HTTP policy to determine whether HTTP traffic is allowed to be transmitted to its destination for the determined identity.

9. The non-transitory machine-readable storage medium of claim 8, wherein the operations further include:
responsive to determining that the DNS query is allowed to be resolved, resolving the DNS query, and transmitting a DNS response to the computing device.

10. The non-transitory machine-readable storage medium of claim 8, wherein the operations further include:
responsive to determining that the determined identity is not allowed to access the private application, blocking the requested access.

11. The non-transitory machine-readable storage medium of claim 8, wherein the operations further include:
responsive to determining that the determined identity is allowed to access the private application, causing the request to access the private application to be transmitted to the private application.

12. The non-transitory machine-readable storage medium of claim 8, wherein the operations further include:
responsive to determining that the HTTP traffic is not allowed to be transmitted to its destination for the determined identity, blocking the HTTP traffic from being transmitted.

13. The non-transitory machine-readable storage medium of claim 8, wherein the operations further include:
responsive to determining that the HTTP traffic is allowed to be transmitted to its destination for the determined identity, causing the HTTP traffic to be transmitted to its destination.

14. The non-transitory machine-readable storage medium of claim 8, wherein the SIM is on a removable Universal Integrated Circuit Card (UICC) or on an Embedded Universal Integrated Circuit Card (EUICC).

15. A server, comprising:
a processor; and
a non-transitory machine-readable storage medium that provides instructions that, when executed by the processor causes operations to be performed including:
receiving a domain name system (DNS) query at a distributed cloud computing network, wherein the DNS query originates from a computing device using a mobile data connection, wherein the DNS query is associated with an identifier of a subscriber identification module (SIM) of the computing device;
determining, using the SIM identifier, an identity for identity-based policy enforcement at the distributed cloud computing network;
determining a DNS policy that is applicable for the determined identity and DNS query;
enforcing the DNS policy to determine whether the DNS query is allowed to be resolved for the determined identity;
receiving, at the distributed cloud computing network, a request to access a private application, wherein the request to access the private application originates from the computing device using the mobile data connection, wherein the request to access the private application is associated with the SIM identifier of the computing device;
determining an access policy that is applicable for the determined identity and private application;
enforcing the access policy to determine whether the determined identity is allowed to access the private application;
receiving first IP traffic at the distributed cloud computing network that has a first IP destination, the first IP traffic originating from the computing device using the mobile data connection, wherein the first IP traffic is associated with the first SIM identifier of the computing device;
determining a first network policy that is applicable for the determined identity and first IP destination;
enforcing the first network policy to determine whether the first IP traffic is allowed to be transmitted to the first IP destination for the determined identity;
responsive to determining that the first IP traffic is not allowed to be transmitted to the first IP destination for the determined identity, blocking the first IP traffic from being transmitted to the first IP destination;
receiving second IP traffic at the distributed cloud computing network that has a second IP destination, the second IP traffic originating from the computing device using the mobile data connection, wherein the second IP traffic is associated with the first SIM identifier of the computing device;
determining a second network policy that is applicable for the determined identity and second IP destination;
enforcing the second network policy to determine whether the second IP traffic is allowed to be transmitted to the second IP destination for the determined identity;
responsive to determining that the second IP traffic is allowed to be transmitted to the second IP destination for the determined identity, causing the second IP traffic to be transmitted to the second IP destination;
receiving HTTP traffic at the distributed cloud computing network, the HTTP traffic originating from the computing device using the mobile data connection, wherein the HTTP traffic is associated with the SIM identifier of the computing device;
determining an HTTP policy that is applicable for the determined identity and HTTP traffic; and
enforcing the HTTP policy to determine whether HTTP traffic is allowed to be transmitted to its destination for the determined identity.

16. The server of claim 15, wherein the operations further include:
responsive to determining that the DNS query is allowed to be resolved, resolving the DNS query, and transmitting a DNS response to the computing device.

17. The server of claim 15, wherein the operations further include:
responsive to determining that the determined identity is not allowed to access the private application, blocking the requested access.

18. The server of claim 15, wherein the operations further include:
   responsive to determining that the determined identity is allowed to access the private application, causing the request to access the private application to be transmitted to the private application.

19. The server of claim 15, wherein the operations further include:
   responsive to determining that the HTTP traffic is not allowed to be transmitted to its destination for the determined identity, blocking the HTTP traffic from being transmitted.

20. The server of claim 15, wherein the operations further include:
   responsive to determining that the HTTP traffic is allowed to be transmitted to its destination for the determined identity, causing the HTTP traffic to be transmitted to its destination.

21. The server of claim 15, wherein the SIM is on a removable Universal Integrated Circuit Card (UICC) or on an Embedded Universal Integrated Circuit Card (EUICC).

* * * * *